United States Patent [19]

Kobayashi

[11] Patent Number: 4,497,204
[45] Date of Patent: Feb. 5, 1985

[54] LIQUID GAUGE
[75] Inventor: Hiroshi Kobayashi, Yokohama, Japan
[73] Assignee: Nissan Motor Company, Limited, Japan
[21] Appl. No.: 338,111
[22] Filed: Jan. 8, 1982
[30] Foreign Application Priority Data Jan. 9, 1981 [JP] Japan ..................................... 56-1047

[51] Int. Cl.³ ............................................. G01F 23/00
[52] U.S. Cl. .................................. 73/304 C; 340/620; 324/61 P
[58] Field of Search .............. 340/618, 620; 73/304 C; 324/61 P

[56] References Cited
U.S. PATENT DOCUMENTS 4,107,658  8/1978  Hill et al. ............................ 340/620

FOREIGN PATENT DOCUMENTS 1209615   9/1972   United Kingdom .
1523338   8/1978   United Kingdom .
2059596A  10/1979  United Kingdom .
1601338   10/1981  United Kingdom .

Primary Examiner—Charles A. Ruehl
Assistant Examiner—Daniel Myer
Attorney, Agent, or Firm—Lowe, King, Price & Becker

[57] ABSTRACT

In a capacitance type liquid level measurement gauge having an oscillation circuit including a frequency generator, a capacitance and a resistance which is connected in series with the capacitance, the capacitance including a pair of electrode plates submergible in a liquid to be measured, there is provided a further condenser which is connected in series with the capacitance.

18 Claims, 3 Drawing Figures

LIQUID GAUGE

BACKGROUND OF THE INVENTION

1. Field of the Invention

The present invention relates in general to a liquid gauge for measuring the quantity of a liquid, and more particularly to a so-called capacitance type liquid gauge which detects the quantity of a liquid existing in a container by disposing a pair of electrode plates in the container and measuring the capacitance established between the electrode plates.

2. Description of the Prior Art

A so-called capacitance type liquid gauge has been used in motor vehicles for measuring the quantity of fuel or gasoline existing in a fuel tank of the vehicle. This type gauge is constructed by employing the advantageous phenomenon in which the capacitance established between two parallel electrode plates disposed in a liquid container varies with increase or decrease of the liquid in the container. The capacitance C between the paired electrode plates is the sum of the capacitance established between the respective portions thereof of the plates which are submerged in the liquid and the capacitance established between the remaining portions thereof which are exposed to air, and the total capacitance C is expressed in the following equation.

$$C = E_L \frac{S \cdot x}{d} + E_A \frac{S(1-x)}{d} \quad (1)$$

where $E_L$ is the dielectric constant of the liquid, $E_A$ is the dielectric constant of air, d is the distance between the two electrode plates, S is the effective surface area of one electrode plate, and x is the ratio of the liquid-submerged portion of the area of one electrode plate to the effective surface area S. As is understood from this equation, when the liquid level in the container rises or lowers, the value x changes causing variation in the value of the summed capacitance. By suitably processing the variation of the summed capacitance, it is possible to indicate the liquid level in the container on a meter which may be either of analog type or digital type.

In practical liquid gauges based on the above described principle, it is popular to utilize the variation in the capacitance C to vary the frequency of a pulse signal generated by a CR oscillator which includes a resistance R connected in series with the capacitor constituted of the two electrode plates to determine a time-constant. The hitherto used liquid gauges of the type mentioned above exhibit a satisfactory performance in detecting the quantity of liquid especially when the liquid is of a type having relatively small dielectric loss, such as gasoline.

Apart from the above, for dealing with the energy crisis, it is currently proposed to use as a substitute for gasoline a so-called gasohol, which is a mixture of gasoline and alcohol. However, the hitherto used capacitance type liquid gauge fails to exhibit its normal performance against such gasohol because it has a dielectric loss considerably greater than that of gasoline due to addition of alcohol.

SUMMARY OF THE INVENTION

It is therefore an object of the present invention to provide an improved capacitance type liquid gauge which can detect the quantity of liquid even when it has relatively large dielectric loss.

According to the present invention, there is provided a capacitance type liquid gauge which comprises oscillation means including a frequency generator, a capacitance and a resistance which is connected in series with the capacitance, the capacitance including a pair of electrode plates submergible in a liquid to be measured; a condenser connected in series with the capacitance; and indicating means for visually or acoustically indicating the quantity of the liquid by processing a signal generated by the oscillation means.

DESCRIPTION OF THE INVENTION

Prior to describing the invention, a reason is considered for failure of the conventional capacitance type liquid gauge to detect the liquid quantity, when the liquid has a larger dielectric loss as compared with gasoline, for example.

Figure 1:
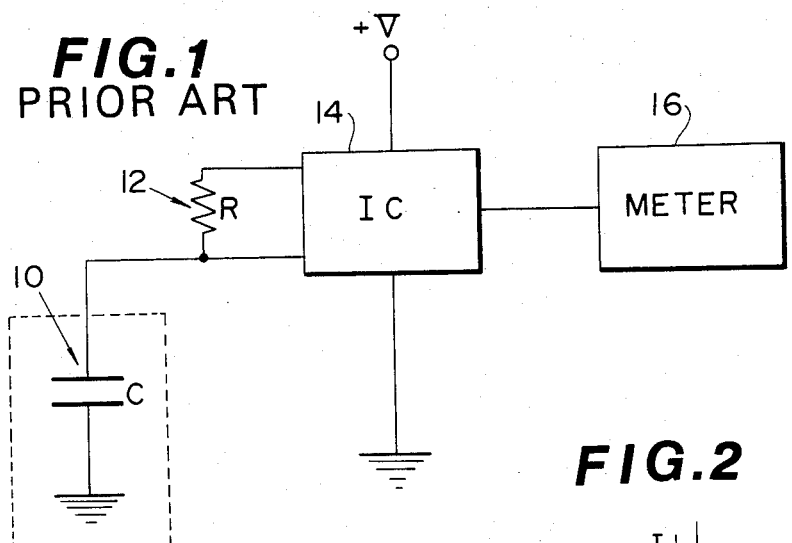
FIG. 1 is a circuit of a hitherto used capacitance type liquid gauge incorporating therein a CR oscillator.
Figure 2:
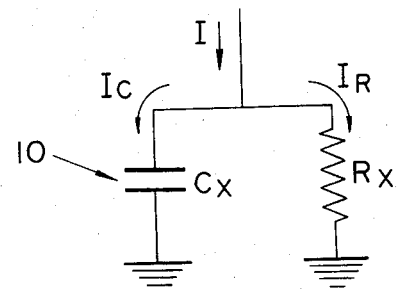
FIG. 2 is a detailed circuit of a portion enclosed by a broken line in FIG. 1.

Referring to FIGS. 1 and 2, especially FIG. 1, there is shown a circuit of the conventional capacitance type liquid gauge, which comprises a capacitance 10 including a pair of spaced parallel electrode plates disposed in a liquid container, a resistance 12 connected in series with the capacitance 10, a 555 type IC 14 forming a timer with which the capacitance 10 and the resistance 12 are both connected, and a meter 16 by which the liquid level or quantity is visually or acoustically indicated. The capacitance 10, the resistance 12 and the IC 14 constitute a CR oscillator, and as has been mentioned before, the frequency of a pulse signal generated by the CR oscillator is controlled by the time-constant which is determined by both the capacitance C and the resistance R.

In using the above-mentioned conventional liquid gauge for measuring a liquid (such as gasohol) having a relatively high dielectric loss, an undesirable cessation of oscillation tends to occur especially when the electrode plates of the capacitance 10 are fully submerged in the liquid, that is, when the liquid container is substantially full with the liquid. This, of course, induces a failure in detecting the quantity of liquid in the container.

This undesirable phenomenon may be based on the following reason. When considering the capacitance C from a different perspective, it becomes equal to a theoretical circuit illustrated by FIG. 2, which comprises a capacitance $C_x$ and a resistance $R_x$ connected in parallel with the capacitance $C_x$. The values $C_x$ and $R_x$ are expressed in the following equations.

$$C_x = E_L \frac{S}{d} x + E_A \frac{S}{d} (1-x) \quad (2)$$

$$R_x = \frac{1}{\omega C \tan \delta} \quad (3)$$

where $\omega$ is angular frequency and $\tan \delta$ is dielectric loss. Thus, when the electrode plates are largely submerged in the liquid having a high dielectric loss, the capacitance $C_x$ increases and the resistance $R_x$ decreases. The current I flowing into the capacitance 10 is distributed to both the capacitance $C_x$ and the resistance $R_x$ as distributed current $I_C$ and $I_R$. In this instance, however, the current $I_R$ directed to the resistance $R_x$ is very much greater than the other current $I_C$ directed to the capacitance $C_x$, so that the capacitance $C_x$ loses its normal function. With this reason, it seems that the oscillation stops at the full liquid condition.

The present invention is presented by taking the above-mentioned principle into consideration. In the following, the improved liquid gauge of the invention will be described with reference to FIG. 3.

Figure 3:
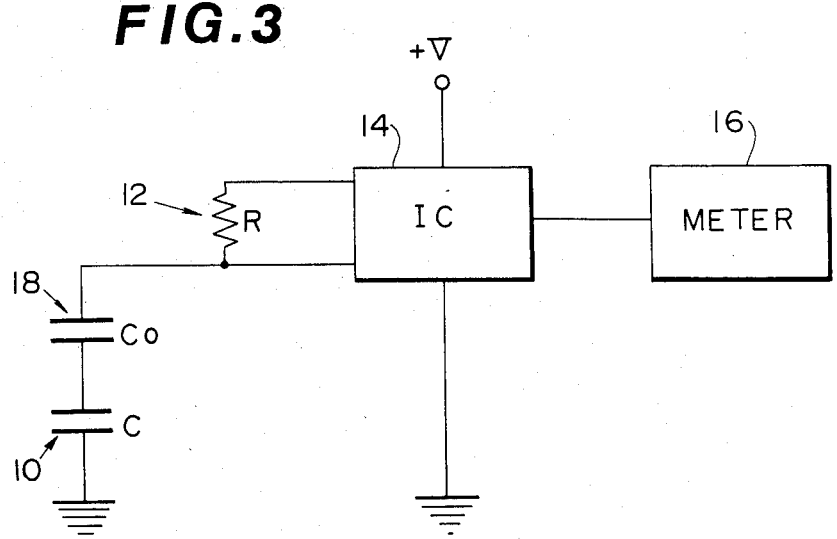
FIG. 3 is a circuit of an improved capacitance type liquid gauge according to the present invention.

In FIG. 3, a circuit of the liquid gauge of the invention is shown, in which the same numerals as in FIG. 1 denote the corresponding construction parts. As is shown, a condenser 18 having a capacitance $C_o$ is connected in series with the capacitance C. With this arrangement, the total capacitance C' of the CR oscillator is expressed in the following equation.

$$C' = \frac{C \cdot C_o}{C + C_o} = \frac{C}{1 + C/C_o} \quad (4)$$

The frequency of a pulse signal from the CR oscillator is thus controlled by the time-constant determined by both the resistance R and the total capacitance C'. Thus, in order that the presence of the condenser 18 has substantially no effects on the oscillation frequency, it becomes necessary to decrease the value of $C/C_o$ to be as small as possible. In short, it is necessary to establish a relationship of $C_o > > C$. Experiment has revealed that when the capacitance $C_o$ of the condenser 18 is determined to be about one hundred times as large as the capacitance C established by the electrode plates being fully submerged in the liquid, there is little problem in practical usage.

In measuring a liquid having a high dielectric loss with the liquid gauge of the invention, discharging and charging are carried out by the condenser 18 thereby forcing the capacitance C to continue to carry out the cycles of discharging and charging, so that the oscillation continues without stop.

Of course, measurement of a liquid having a low dielectric loss can be also made by the liquid gauge of the invention without problems.

What is claimed is:

1. A capacitance type liquid level measuring gauge comprising:
   oscillation means including a frequency generator connected to generate a signal having a frequency determined as a function of capacitance and resistance, a measuring capacitor and a resistor connected in series with each other and further connected to said frequency generator, said measuring capacitor including a pair of electrode plates submergible in a liquid having a level to be measured;
   a condenser connected in series with said measuring capacitor, the capacitance of said condenser being greater than the capacitance established for said measuring capacitor when said electrode plates are substantially fully submerged within the liquid; and
   indicating means for indicating the quantity of the liquid by processing a signal generated by said oscillation means.

2. A capacitance type liquid level measuring gauge as claimed in claim 1, in which said condenser has a capacitance which is approximately one hundred times larger than the capacitance established for said measuring capacitor by the electrode plates being fully submerged in said liquid.

3. A capacitance type liquid gauge as claimed in claim 2, in which said frequency generator of said oscillation means is a 555 type IC.

4. A liquid gauge comprising continuously oscillating oscillation means including a frequency generator 14, a first capacitor 10 and a resistor 12 which is connected in series with said first capacitor, an indicating means 16 for visually or acoustically indicating the quantity of the liquid by processing a signal generated by said oscillation means, said first capacitor including a pair of spaced electrode plates which are submersible in a liquid the quantity of which is to be measured, which is characterized in that a second capacitor 18 is interposed in series between said first capacitor and said resistor, the capacitance of said second capacitor is determined greater than that of said first capacitor which is established by said electrode plates being substantially fully submerged in the liquid, said oscillating means is connected for continuously oscillating so long as the electrode plates are submerged in the liquid.

5. In a capacitance type liquid quantity measuring gauge having an oscillator connected to a measuring capacitor for producing a signal having a frequency determined by said capacitor, and an indicating means for providing a substantially continuously variable indication of the quantity of a liquid being measured, said capacitor including a pair of spaced electrode plates submergible in the liquid to be measured, the improvement comprising:
   compensating means, connected to said measuring gauge for maintaining oscillation of said oscillator and for maintaining accurate indication by said indicating means of the quantity of liquid for different liquids having different dielectric characteristics.

6. The improved capacitance type liquid quantity measuring gauge recited in claim 5, wherein said compensating means comprises means for forcing said measuring capacitor to discharge and to charge in liquids having a high dielectric loss.

7. The improved capacitance type liquid quantity measuring gauge recited in claim 6, wherein said different liquids include gasoline and gasohol, respectively.

8. The improved capacitance type liquid quantity measuring gauge recited in claim 6, wherein said compensating means comprises a further capacitor connected to said measuring capacitor.

9. The improved capacitance type liquid quantity measuring gauge recited in claim 8, wherein said further capacitor is connected in series with said measuring capacitor.

10. The improved capacitance type liquid quantity measuring gauge recited in claim 5, wherein said plates of said measuring capacitor are arranged to provide a capacitance determined as a sum of first and second capacitances determined, respectively, by the dielectric constants of air and of the liquid being measured and by a ratio of a portion of an area of said plates submerged in the liquid to an effective surface area thereof.

11. The improved capacitance type liquid quantity measuring gauge recited in claim 10, wherein said compensating means comprises a further capacitor connected to said measuring capacitor.

12. The improved capacitance type liquid quantity measuring gauge recited in claim 11, wherein said further capacitor is connected in series with said measuring capacitor.

13. The improved capacitance type liquid quantity measuring gauge recited in claim 12, wherein said further capacitor has a capacitance selected to have minimal effects on the frequency generated by said oscillator as determined by said measuring capacitor.

14. The improved capacitance type liquid quantity measuring gauge recited in claim 13, wherein said further capacitor has a capacitance substantially larger than the capacitance of said measuring capacitor.

15. The improved capacitance type liquid quantity measuring gauge recited in claim 14, wherein the capacitance of said further capacitor is at least 100 times the capacitance of said measuring capacitor when said plates thereof are fully submerged in the liquid.

16. The improved capacitance type liquid quantity measuring gauge recited in claim 5, wherein said indicating means comprises means for providing a visual indication of said liquid quantity.

17. The improved capacitance type liquid quantity measuring gauge recited in claim 5, wherein said indicating means comprises means for providing an acoustical indication of said liquid quantity.

18. The improved capacitance type liquid quantity measuring gauge recited in claim 10 wherein the plates of said measuring capacitor are arranged to provide a capacitance determined by $$C = E_L \frac{s}{d} x + E_A \frac{s}{d} (1 - x)$$

wherein
- $E_L$ is the dielectric constant of the liquid being measured
- $E_A$ is the dielectric constant of air
- d is the distance between the two dielectric plates,
- s is the effective surface area of the electrode plates, and
- x is the ratio of the liquid submerged portion of the area of one electrode plate to the effective surface area S.

* * * * *